US012444441B1

(12) United States Patent
Walters

(10) Patent No.: US 12,444,441 B1
(45) Date of Patent: Oct. 14, 2025

(54) SIGNAL SEQUENCE-BASED TIME ALIGNMENT OF MEDIA CONTENT

(71) Applicant: Disney Enterprises, Inc., Burbank, CA (US)

(72) Inventor: Matthew Walters, Toluca Lake, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/892,946

(22) Filed: Sep. 23, 2024

(51) Int. Cl.
| G11B 27/00 | (2006.01) |
| G11B 27/10 | (2006.01) |
| G11B 27/036 | (2006.01) |
| H04N 5/91 | (2006.01) |

(52) U.S. Cl.
CPC .................................. G11B 27/10 (2013.01)

(58) Field of Classification Search
CPC ....... G11B 27/00; G11B 27/10; G11B 27/036; H04N 5/91; H04N 21/00
USPC ................ 386/239, 248, 263, 264, 201, 200
See application file for complete search history.

(56) References Cited

U.S. PATENT DOCUMENTS

| 7,177,470 B2 | 2/2007 | Jasinschi et al. |
| 8,922,674 B2 | 12/2014 | Ranbro |
| 9,693,137 B1 * | 6/2017 | Qureshi ................. G11B 27/10 |
| 10,270,945 B2 | 4/2019 | Wang et al. |
| 11,696,038 B2 | 7/2023 | Bousquet et al. |

| 2017/0105054 A1* | 4/2017 | Bannister ........... H04N 21/4305 |
| 2023/0074279 A1* | 3/2023 | Spitzer-Williams .... G10L 15/26 |
| 2024/0102971 A1* | 3/2024 | Richarz ................. G01D 21/02 |

FOREIGN PATENT DOCUMENTS

| CN | 108337447 A | 7/2018 |
| CN | 114640881 A | 6/2022 |

OTHER PUBLICATIONS

"Automatic Mashup Generation of Multiple-camera Videos" Philips Electronics N.V. 2009 165 Pgs.
Oliver Wang, Christopher Schroers, Henning Zimmer, Markus Gross, Alexander Sorkine-Hornung "VideoSnapping: Interactive Synchronization of Multiple Videos" ACM Transactions on Graphics (TOG), vol. 33, Issue 4, Jul. 27, 2014 10 Pgs.

* cited by examiner

Primary Examiner — Daquan Zhao
(74) Attorney, Agent, or Firm — Farjami & Farjami LLP

(57) ABSTRACT

A system includes a computing platform having a hardware processor, a memory storing software code and one or more signal emission device(s) controlled by the computing platform. The software code is executed to determine, using at least one predetermined signal frequency, a calibration signal sequence including an alignment initiation signal and a unique sequence of synchronization signals identified with a unique time interval, emit during the unique time interval, the alignment initiation signal and emit during the unique time interval after emitting the alignment initiation signal, the unique sequence of synchronization signals. The software code is further executed to receive first and second media content produced by first and second recording devices, the first and second media content produced while the first and second recording devices are situated so as to detect the calibration signal sequence, and time align, using the calibration signal sequence, the first and second media content.

20 Claims, 4 Drawing Sheets

Fig. 2

| Pattern | Red | Green | Blue |
|---|---|---|---|
| 1 | ▨ | | |
| 2 | | ▨ | |
| 3 | | | ▨ |
| 4 | ▨ | ▨ | |
| 5 | ▨ | | ▨ |
| 6 | | ▨ | ▨ |
| 7 | ▨ | ▨ | ▨ |
| 8 | | | |

SIGNAL SEQUENCE-BASED TIME ALIGNMENT OF MEDIA CONTENT

BACKGROUND

In applications in which multiple recording devices are used to generate media content that is to be combined during post processing, time aligning the media content generated by the different recording devices presents challenges. When shooting on a movie or television set, for example, there are occasions during which the production is shooting with multiple cameras, including multiple main cameras, second unit cameras, crash cameras, and witness cameras all having different capabilities. One conventional technique for time aligning cameras, and the primary method in use at present, is known as "jam syncing." In jam synching, a timecode reader/generator looks at external, incoming time code information and then "jams" or creates a new central time code based on that information. However, because only expensive and sophisticated professional grade cameras are typically capable of being jam synced, it remains very difficult to time align media content generated by cameras lacking that ability. Although a visual cue such as a physical slate can be used for the main cameras, such a slate is only useful if the camera has a clear view of the slate, which is typically rare in a multi-camera setup. Thus, there remains a need in the art for a solution making the time alignment of media content generated by multiple disparate recording devices faster and easier.

BRIEF DESCRIPTION OF THE DRAWINGS

FIG. 2 shows a table of exemplary optical signal patterns suitable for use in performing signal sequence-based time alignment of media content, according to one implementation;

DETAILED DESCRIPTION

Figure 1:
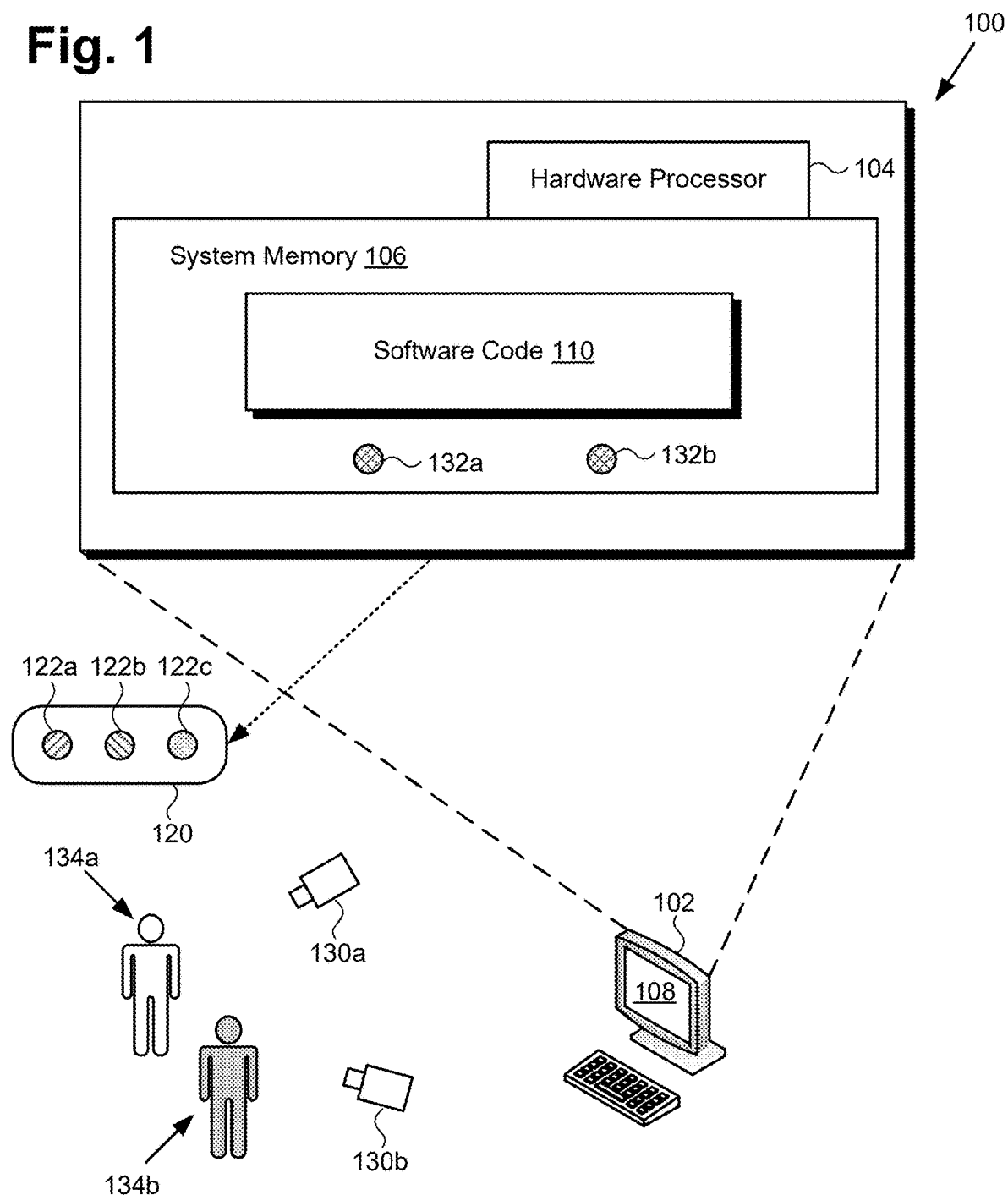
FIG. 1 shows an exemplary system for performing signal sequence-based time alignment of media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in applications in which multiple recording devices are used to generate media content that is to be combined during post processing, time aligning the media content generated by the different recording devices presents challenges. When shooting on a movie or television set, for example, there are occasions during which the production is shooting with multiple cameras, including multiple main cameras, second unit cameras, crash cameras, and witness cameras all having different capabilities.

As also stated above, conventional technique for time aligning cameras in primary use at present, is known as "jam syncing." In jam synching, a timecode reader/generator looks at external, incoming time code information and then "jams" or creates a new central time code based on that information. However, only expensive and sophisticated professional grade cameras are typically capable of being jam synced. Moreover, jam syncing requires that all the cameras be in concurrent communication with the timecode reader/generator. As a result it remains very difficult to time align media content generated by cameras lacking those capabilities. Although a visual cue such as a physical slate can be used for the main cameras, such a slate is only useful if the camera has a clear view of the slate, which is typically rare in a multi-camera setup.

The present application discloses systems and methods for performing signal sequence-based time alignment of media content that address and overcome the drawbacks and deficiencies in the conventional art by advantageously enabling the automated time alignment of media content produced by a variety of recording devices having disparate capabilities without requiring that those recording devices be communicatively coupled to the same timecode source. In addition, although the present solution requires that a recording device be situated so as to be able to detect the signal sequence-based calibration signals utilized by the novel and inventive systems and according to the methods disclosed in the present application, the emission source of those calibration signals advantageously need not be within the line-of-sight of any of those recording devices, unlike conventional approaches reliant on a physical slate.

Thus, the present solution for performing signal sequence-based time alignment of media content advances the state-of-the-art in several ways. Firstly, the present solution improves compatibility by enabling the time alignment of any collection of recording devices capable of detecting the same calibration signal sequence. Secondly, the present solution simplifies setup because no connections or interactions among recording devices is required. Thirdly, the present solution can greatly increase scale because the number of recording devices that can by time aligned is limited only by the number of recording devices capable of detecting the calibration signal sequence. Fourthly, the present solution advantageously removes distance constraints because the calibration signal sequence is captured by the recording sensors of each recording device, making it possible to time align recording devices that are across the world from each other after that calibration signal sequence has been detected.

It is noted that as used in the present application, the terms "automation," "automated" and "automating" refer to systems and processes that do not require the participation of a human system operator. Thus, the methods described in the present application may be performed under the control of the hardware processing components of the disclosed systems. It is further noted that although the present novel and inventive concepts are discussed in detail below by reference to an exemplary use case in which the signal sequence-based calibration signals are optical signals and the recording devices detecting those signal are cameras, that characterization is merely exemplary. In other implementations, the signal sequence-based calibration signals may include optical signals, audio signals, or any combination thereof, while the recording devices may be cameras or audio recording devices.

FIG. 1 shows exemplary system 100 for performing signal sequence-based time alignment of media content, according to one implementation. As shown in FIG. 1, system 100 includes computing platform 102 having hardware processor 104, system memory 106 implemented as a computer-readable non-transitory storage medium, display 108 and signal emission device 120 controlled by computing platform 102. According to the present exemplary implementation, system memory 106 stores software code 110 and media content 132a and 132b described below.

As further shown in FIG. 1, system 100 is implemented within a use environment including exemplary cameras 130a and 130b and one or more subjects 134a and 134b. Also shown in FIG. 1 are one or more emission sources 122a, 122b and 122c of signal emission device 120, media content 132a produced by camera 130a, and media content 132b produced by camera 130b.

It is noted that although subjects 134a and 134b are depicted as humans in FIG. 1, such as performers or presenters for instance, that representation is provided merely as an example. More generally one or more of subjects 134a and 134b may be or include a human being, an animal, or a robot having articulated joints, for example. Alternatively, or in addition, in some use cases, one or more of subjects 134a and 134b may be an inanimate object such as a thrown ball, a projectile, or an autonomous or wirelessly controlled vehicle or toy, to name a few examples. It is further noted that although FIG. 1 depicts two subjects 134a and 134b, in various use cases, subjects 134a and 134b may represent a single subject, two subjects, or more than two subjects.

It is also noted that, although FIG. 1 depicts two cameras 130a and 130b producing two units of media content 132a and 132b, in other implementations more than two cameras may each produce a unit of media content to be signal sequence-based time aligned according to the present concepts. Thus, in various implementations, cameras 130a and 130b may represent two cameras, or more than two cameras. Furthermore, cameras 130a and 130b may have different frame rates. For example, one or more of cameras 130a and 130b may have a frame rate of twenty-four frames per second (24 fps), while one or more other cameras of cameras 130a and 130b may have a frame rate of 30 fps or 60 fps, for instance, or any other suitable frame rate for producing media content 132a and 132b.

Cameras 130a and 130b may be digital video cameras, for example. In some implementations, cameras 130a and 130b may be configured to capture color digital images. In one such implementation, cameras 130a and 130b may be red-green-blue (RGB) color video camera(s), for example. Alternatively, or in addition, cameras 130a and 130b may be depth cameras, such as RGB-D cameras. In other implementations, cameras 130a and 130b may correspond to any other suitable optical sensor(s) for producing media content 132a and 132b. Moreover, in some implementations, one or more of cameras 130a and 130b may be a camera included as a feature of a personal communication device, such as a smartphone, for example.

Referring to system 100, system memory 106 may take the form of any computer-readable non-transitory storage medium. The expression "computer-readable non-transitory storage medium," as defined in the present application, refers to any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110, media content 132a and media content 132b as being co-located in a single instance of system memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Thus, it is to be understood that media content 132a and media content 132b may be stored and time aligned, and software code 110 may be stored and executed, using the distributed memory and processor resources of system 100.

Hardware processor 104 may include multiple hardware processing units, such as one or more central processing units, one or more graphics processing units, and one or more tensor processing units, one or more field-programmable gate arrays (FPGAs), custom hardware for machine learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs such as software code 110 from system memory 106, while a GPU may be implemented to reduce the processing overhead of the CPU by performing computationally intensive graphics or other processing tasks. A TPU is an application-specific integrated circuit (ASIC) configured specifically for artificial intelligence applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance to communicate with signal emission device 120, as well as with one or more of cameras 130a and 130b in some implementations.

In other implementations, however, and as shown in FIG. 1, system 100 may take the form of a desktop computer, or alternatively a tablet computer, laptop computer, or smartphone, for example, providing display 108. Display 108 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 108 may be physically integrated with computing platform 102 or may be communicatively coupled to but physically separate from computing platform 102. For example, where system 100 is implemented as a smartphone, laptop computer, or tablet computer, display 108 will typically be integrated with computing platform 102. By contrast, where system 100 is implemented as a desktop computer, display 108 may take the form of a monitor separate from computing platform 102 in the form of a computer tower.

It is also noted that, in various implementations, signal emission device 120 may be an optical emission device, an audio emission device, or a device configured to emit one or more optical signals and one or more audio signals. However, in the interests of conceptual clarity, signal emission device 120 is described below as an exemplary optical emission device including one or more emission sources 122a, 122b and 122c. Although FIG. 1 depicts one signal emission device 120 including three emission sources 122a, 122b and 122c, in other implementations signal emission device 120 may correspond to multiple signal emission devices (hereinafter "signal emission device(s) 120"), each of which may include as few as one emission source, two emission sources, three emission sources, or more than three emission sources. Moreover, in some implementations in which multiple signal emission devices 120 are used, those signal emission devices 120 may be synchronized together so as to emit the same signal or signals concurrently. Furthermore, one or more of emission sources 122a, 122b and 122c may be sources of visible light, such as LEDs for example. For instance, in one implementation, emission source 122a may be an LED or other light source that emits red light, emission source 122b may be an LED or other light source that emits green light and emission source 122c may be an LED or other light source that emits blue light.

Figure 2:
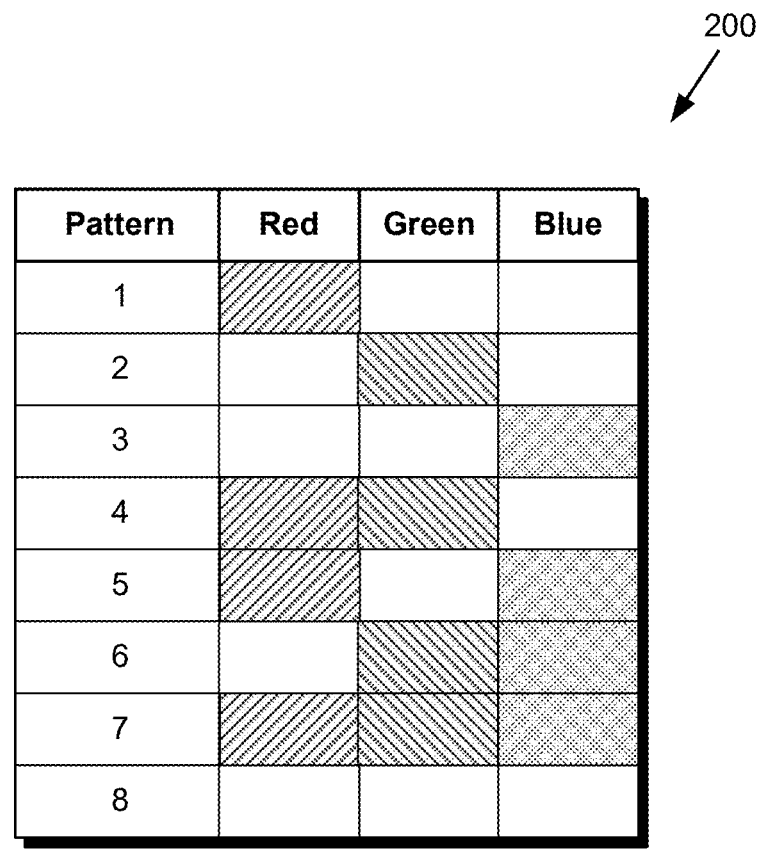

FIG. 2 shows table 200 of exemplary optical signal patterns suitable for use in performing signal sequence-based time alignment of media content, according to one implementation. According to the exemplary implementation represented by FIG. 2, the present signal sequence-based time alignment method and system may color sequence patterns to cause specific detectable histogram spikes during an initiation process, which allows for a post process to read the histogram spike pattern and align all camera footage regardless of make, model, or features.

For example, and referring to FIG. 1, signal emission device(s) 120 may take the form of one or more LED systems configured to flash red, green, or blue light, or various combinations of red, green and blue light, at a rate of 24 fps for example, using emission sources 122a, 122b and 122c. Those colored flashes can be synchronized to a physical slate or used as a stand-alone trigger process and can be produced using a single instantiation of signal emission device 120 or several instantiations of signal emission devices 120 linked together so as to emit signals concurrently.

When emission sources 122a, 122b and 122c are activated to flash, the flashes they produce will cause specific color spikes in the histograms of images captured by each of cameras 130a and 130b. With three colors, as depicted in table 200, seven different color patterns can be produced, and an eighth null signal pattern in which none of emission sources 122a, 122b, or 122c emits light may be used as a baseline reference pattern. Thus, and as shown in FIG. 2, pattern 1 may be a red flash only, pattern 2 may be a green flash only, pattern 3 may be a blue flash only, pattern 4 may include concurrent red and green flashes, pattern 5 may include concurrent red and blue flashes, pattern 6 may include concurrent green and blue flashes, and pattern 7 may include concurrent red, green and blue flashes, with pattern 8 used as a baseline reference.

Figure 3:
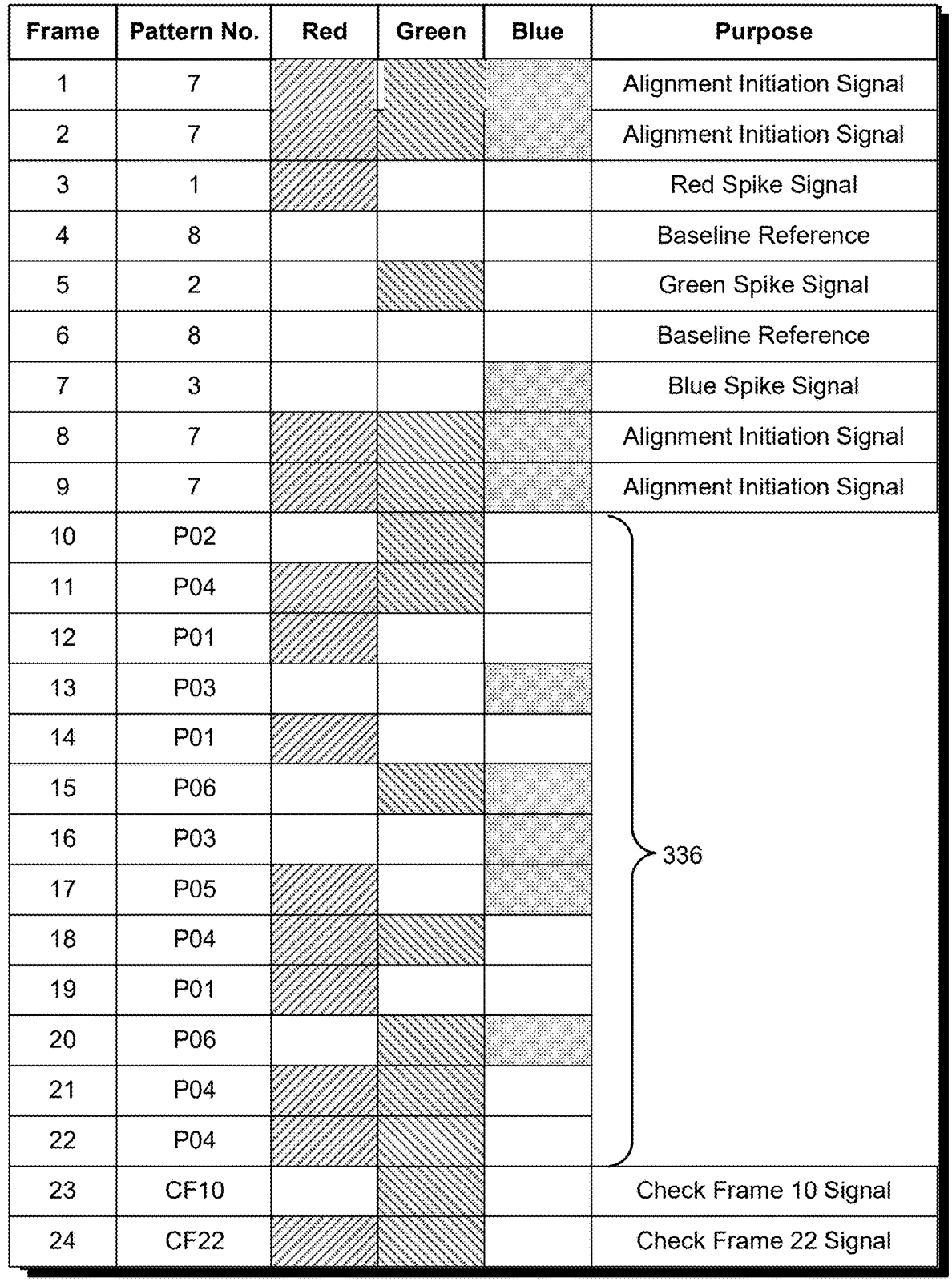
FIG. 3 shows an exemplary calibration signal sequence suitable for use in performing signal sequence-based time alignment of media content, according to one implementation.

Using patterns 1 through 8 from table 200 and 24 frames for example, a calibration signal sequence can be generated that can be detected and read by looking at the histogram of each frame. FIG. 3 shows such a calibration signal sequence as exemplary calibration signal sequence 300, according to one implementation. According to the exemplary implementation shown in FIG. 3, calibration signal sequence 300 includes a calibration initiation signal sequence as frames 1 through 9, unique sequence of synchronization signals 336 as frames 10 through 22, and a check signal sequence as frames 23 and 24.

It is noted that the sequence of signals shown to be included in calibration signal sequence 300 is merely exemplary. For example, in other implementations, a calibration signal sequence may have as few as one calibration initiation signal, e.g., one of the alignment initiation signals shown in frames 1, 2, 8, or 9, may omit check signal sequence frames 23 and 24, or may include only one of frames 1, 2, 8, or 9 and omit check signal sequence frames 23 and 24. However, in all implementations, calibration signal sequence 300 includes a unique sequence of synchronization signals corresponding to unique sequence of synchronization signals 336, although in other implementations unique sequence of synchronization signals 336 may include more, or fewer than the thirteen synchronization signals included in unique sequence of synchronization signals 336. For example, in other implementations in which three color spike signals are used in combination to provide unique sequence of synchronization signals 336, unique sequence of synchronization signals 336 may include eleven or twelve synchronization signals, rather than thirteen. However, in implementations in which fewer than three distinct signals are used to provide unique sequence of synchronization signals 336, unique sequence of synchronization signals 336 may include more than thirteen synchronizations signals.

Referring to FIGS. 2 and 3 in combination, in some implementations, patterns 1 through 6 in table 200 may be used in the calibration initiation signal sequence of frames that includes frames 1 through 9, as well as in unique sequence of synchronization signals 336, while pattern 7 is only used as an alignment initiation signal in frames 1, 2, 8 and 9 of the calibration initiation signal sequence of frames, and pattern 8 is used only as a baseline reference signal in frames 4 and 6.

Frames 3 through 7 of calibration signal sequence 300 are the color spike reference signals for the red, green and blue light emissions each produced by a respective one of emission sources 122a, 122b and 122c of signal emission device(s) 120, in FIG. 1, with each color spike reference signal being separated from another by a baseline reference signal. When signal emission device(s) 120 use emission sources 122*a*, 122*b* and 122*c* to produce calibration signal sequence 300 at an emission rate of twenty-four emissions per second, calibration signal sequence 300 corresponds uniquely to a unique second of time. Moreover, using thirteen frames to provide unique sequence of synchronization signals 336, i.e., frames 10-22 of calibration signal sequence 300, and six different patterns of signals, i.e., patterns 1 through 6 in FIG. 2, a different unique sequence of synchronization signals 336 may be generated to correspond respectively to each unique second for a span of over four hundred years. By way of comparison, using twelve frames to provide unique sequence of synchronization signals 336 using six different patterns of signals enables unique sequence of synchronization signals 336 to be generated so as to correspond respectively to each unique second for approximately sixty-nine years, while using eleven frames and six patterns would enable unique sequence of synchronization signals 336 to be generated so as to correspond respectively to each unique second for approximately eleven and one half years.

Frames 23 and 24 of calibration signal sequence 300 are check frames that repeat the first and last patterns of unique sequence of synchronization signals 336, i.e., frame 23 repeats the signal pattern of frame 10, and frame 24 repeats the signal pattern of frame 22. This creates an error check, so that during media content alignment, software code 110 of system 100 in FIG. 1 knows it is finding the correct patterns in the correct frames. Any image processing tool can use the color signal spikes to see the color pattern changes, read the pattern key and lookup the corresponding unique second in time that is represented by unique sequence of synchronization signals 336. Each of media content 132*a* and 132*b* being recorded by a different one of cameras 130*a* and 130*b* at that time will have the same unique pattern, which can be used to time align media content 132*a* and 132*b*.

Figure 4:
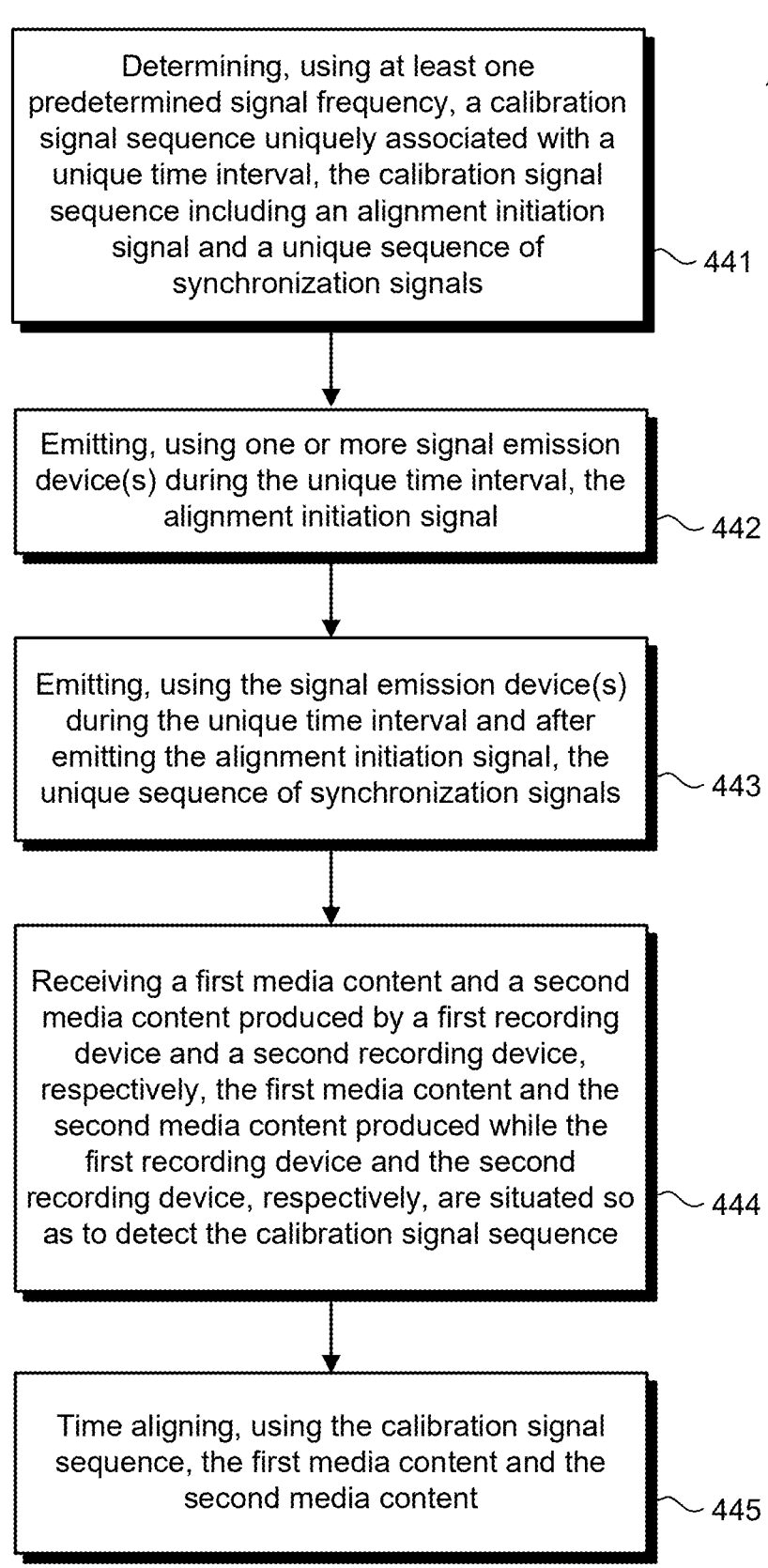
FIG. 4 shows a flowchart presenting an exemplary method for performing signal sequence-based time alignment of media content, according to one implementation.

The functionality of system 100 including software code 110 and signal emission device(s) 120 will be further described by reference to FIG. 4. FIG. 4 shows flowchart 440 presenting an exemplary method for performing signal sequence-based time alignment of media content, according to one implementation. With respect to the method outlined in FIG. 4, it is noted that certain details and features have been left out of flowchart 440 in order not to obscure the discussion of the inventive features in the present application.

Referring to FIG. 4, with further reference to FIG. 3, flowchart 440 includes determining, using at least one predetermined signal frequency, calibration signal sequence 300 identified with a unique time interval, calibration signal sequence 300 including an alignment initiation signal, e.g., frame 1 of calibration signal sequence 300, and unique sequence of synchronization signals 336 (action 441). As noted above, in various implementations unique sequence of synchronization signals 336 may include audio signals, optical signals, or a combination of audio signals and optical signals. In implementations in which unique sequence of synchronization signals 336 are optical signals, the at least one predetermined signal frequency may be a frequency of visible light, such as one or more of red, green, or blue light, for example. Moreover, in some implementations, the at least one predetermined signal frequency used in determining calibration signal sequence 300 may include more than one predetermined frequency, such as two predetermined frequencies or three predetermined frequencies, for example.

As further noted above, in some implementations, the unique time interval with which calibration signal sequence 300 is identified may be single unique second of time. Furthermore, and as shown in FIG. 3, in implementations in which unique sequence of synchronization signals 336 includes three predetermined signal frequencies and uses six different frequency patterns, unique sequence of synchronization signals 336 may include at least eleven synchronization signals and up to thirteen synchronization signals. As further shown in FIG. 3, in addition to an alignment initiation signal and unique sequence of synchronization signals 336, calibration signal sequence 300 may further include one or more of an additional alignment initiation signal or signals, a reference signal for each predetermined signal frequency used to determine calibration signal sequence 300, one or more baseline reference signals, and one or more check signals. Referring to FIGS. 1, 3 and 4 in combination, the determination of calibration signal sequence 300, in action 441, may be performed by software code 110, executed by hardware processor 104 of system 100.

Continuing to refer to FIG. 4 in combination with FIGS. 1 and 3, flowchart 440 further includes emitting, using signal emission device(s) 120 during the unique time interval with which calibration signal sequence 300 is identified, the alignment initiation signal, e.g., frame 1 of calibration signal sequence 300 (action 442). As discussed above by reference to FIGS. 1 and 3, in some implementations signal emission device(s) 120 may be one or more light emitters each including one or more of emission source 122*a* configured to emit red light, emission source 122*b* configured to emit green light, and emission source 122*c* configured to emit blue light. Moreover, in some implementations, signal emission device(s) 120 may have a signal emission rate of twenty-four emissions per second, for example, or any other desirable signal emission rate. The emission of the alignment initiation signal of calibration signal sequence 300, in action 442, may be performed by software code 110, executed by hardware processor 104 of system 100, and using signal emission device(s) 120.

Continuing to refer to FIG. 4 in combination with FIGS. 1, 2 and 3, flowchart 440 further includes emitting, using signal emission device(s) 120 during the unique time interval with which calibration signal sequence 300 is identified and after emitting the alignment initiation signal in action 442, unique sequence of synchronization signals 336 (action 443). As noted above, unique sequence of synchronization signals 336 may be emitted using various combinations of emission sources 122*a*, 122*b* and 122*c* to produce signal patterns 1 through 6 in FIG. 2. The emission of unique sequence of synchronization signals 336, in action 443, may be performed by software code 110, executed by hardware processor 104 of system 100, and using signal emission device(s) 120.

Continuing to refer to FIG. 4 in combination with FIGS. 1 and 3, flowchart 440 further includes receiving media content 132*a* and media content 132*b* produced by a first recording device (hereinafter camera 130*a*) and a second recording device (hereinafter camera 130*b*), respectively, media content 132*a* and media content 132*b* being produced while camera 130*a* and camera 130*b*, respectively, are situated so as to detect calibration signal sequence 300 (action 444). It is emphasized that although cameras 130*a* and 130*b* need to be able to detect calibration signal sequence 300, signal emission device(s) 120 used to generate calibration signal sequence 300 does not need to be in the field-of-view of either of camera 130*a* or camera 130*b*. Thus, in some use cases, some or all of signal emission device(s) 120 may be outside of the field-of-view of one or more of cameras 130a and 130b. Media content 132a and media content 132b may be received, in action 444, by software code 110, executed by hardware processor 104 of system 100.

Media content 132a and 132b may be received in action 444 in a number different ways. In some use cases, for example, system 100 may be in wireless communication with one or more of cameras 130a and 130b. In those use cases, one or more of media content 132a and 132b may be received from one or more of cameras 130a and 130b as a wireless transmission. Alternatively, or in addition, one or more of media content 132a and 132b may be received from one or more of cameras 130a and 130b via one or more wired communication links. As another alternative, or in addition, one or more of media content 132a and 132b may be saved to a portable computer-readable non-transitory storage device, such as a FLASH thumb drive, for example, and may be received by system 100 by being saved to system memory 106 from such a portable storage device.

Media content 132a and 132b may include content from a linear television (TV) program stream, for example, that includes a high-definition (HD) or ultra-HD (UHD) baseband video signal with embedded audio, captions, time code, and other ancillary metadata, such as ratings and/or parental guidelines. In some implementations, media content 132a and 132b may also include multiple audio tracks, and may utilize secondary audio programming (SAP) and/or Descriptive Video Service (DVS), for example. Alternatively, in some implementations, media content 132a and 132b may be movie or video game content.

Continuing to refer to FIGS. 1, 3 and 4 in combination, flowchart 440 further includes time aligning, using calibration signal sequence 300, media content 132a and media content 132b (action 445). As noted above by reference to FIG. 3, the color signal spikes in unique sequence of synchronization signals 336 can be used to detect the color pattern changes, read the pattern key and lookup the corresponding unique second in time that is represented by unique sequence of synchronization signals 336. Each of media content 132a and 132b being recorded by a different one of cameras 130a and 130b at that time will have the same unique pattern, which can be used to time align media content 132a and 132b.

The time alignment of media content 132a with media content 132b, using calibration signal sequence 300 in action 445, may be performed by software code 110, executed by hardware processor 104 of system 100. With respect to the method outlined by FIG. 4, it is emphasized that actions 441-445 may be performed in an automated process from which human involvement may be omitted.

Thus, the present application discloses systems and methods for performing signal sequence-based time alignment of media content that address and overcome the drawbacks and deficiencies in the conventional art by advantageously enabling the automated time alignment of media content produced by a variety of recording devices having disparate capabilities without requiring that those recording devices be communicatively coupled to the same timecode source. In addition, although the present solution requires that a recording device be situated so as to be able to detect the signal sequence-based calibration signals utilized by the novel and inventive systems and according to the methods disclosed in the present application, the emission source of those calibration signals advantageously need not be within the line-of-sight of any of those recording devices, unlike conventional approaches reliant on a physical slate.

As a result, the present solution for performing signal sequence-based time alignment of media content advances the state-of-the-art in several ways. Firstly, the present solution improves compatibility by enabling the time alignment of any collection of recording devices capable of detecting the same calibration signal sequence. Secondly, the present solution simplifies setup because no connections or interactions among recording devices is required. Thirdly, the present solution can greatly increase scale because the number of recording devices that can by time aligned is limited only by the number of recording devices capable of detecting the calibration signal sequence. Fourthly, the present solution advantageously removes distance constraints because the calibration signal sequence is captured by the recording sensors of each recording device, making it possible to time align recording devices that are across the world from each other after that calibration signal sequence has been detected.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a system memory;
   the system memory storing a software code; and
   one or more signal emission devices controlled by the computing platform;
   the hardware processor configured to execute the software code to:
   determine, using at least one predetermined signal frequency, a calibration signal sequence identified with a unique time interval, the calibration signal sequence including an alignment initiation signal and a unique sequence of synchronization signals;
   emit, using the one or more signal emission devices during the unique time interval, the alignment initiation signal;
   emit, using the one or more signal emission devices during the unique time interval and after emitting the alignment initiation signal, the unique sequence of synchronization signals;
   receive a first media content and a second media content produced by a first recording device and a second recording device, respectively, the first media content and the second media content produced while the first recording device and the second recording device, respectively, are situated so as to detect the calibration signal sequence; and
   time align, using the calibration signal sequence, the first media content and the second media content.

2. The system of claim 1, wherein the unique sequence of synchronization signals comprise at least one of audio signals or optical signals.

3. The system of claim 1, wherein each of the one or more signal emission devices comprises a light emitter, and wherein each of the first recording device and the second recording device comprises a camera.

4. The system of claim 1, wherein the at least one predetermined signal frequency comprises a frequency of visible light.

5. The system of claim 1, wherein the at least one predetermined signal frequency comprises at least one of red, green or blue light.

6. The system of claim 1, wherein the at least one predetermined signal frequency comprises two predetermined frequencies or three predetermined frequencies.

7. The system of claim 1, wherein the unique time interval is a unique second of time.

8. The system of claim 1, wherein an emission rate of the one or more signal emission devices is twenty-four emissions per second.

9. The system of claim 1, wherein the unique sequence of synchronization signals includes at least eleven and up to and including thirteen synchronization signals.

10. The system of claim 1, wherein the calibration signal sequence further comprises at least one of a respective reference signal for each at least one predetermined signal frequency or a second alignment initiation signal.

11. A method for use by a system including a computing platform having a hardware processor, a system memory storing a software code, and one or more signal emission devices controlled by the computing platform, the method comprising:
   determining, by the software code executed by the hardware processor and using at least one predetermined signal frequency, a calibration signal sequence identified with a unique time interval, the calibration signal sequence including an alignment initiation signal and a unique sequence of synchronization signals;
   emitting, by the software code executed by the hardware processor and using the one or more signal emission devices during the unique time interval, the alignment initiation signal;
   emitting, by the software code executed by the hardware processor and using the one or more signal emission device during the unique time interval, after emitting the alignment initiation signal, the unique sequence of synchronization signals;
   receiving, by the software code executed by the hardware processor, a first media content and a second media content produced by a first recording device and a second recording device, respectively, the first media content and the second media content produced while the first recording device and the second recording device, respectively, are situated so as to detect the calibration signal sequence; and
   time aligning, by the software code executed by the hardware processor and using the calibration signal sequence, the first media content and the second media content.

12. The method of claim 11, wherein the unique sequence of synchronization signals comprise at least one of audio signals or optical signals.

13. The method of claim 11, wherein each of the one or more signal emission devices comprises a light emitter and wherein each of the first recording device and the second recording device comprises a camera.

14. The method of claim 11, wherein the at least one predetermined signal frequency comprises a frequency of visible light.

15. The method of claim 11, wherein the at least one predetermined signal frequency comprises at least one of red, green or blue light.

16. The method of claim 11, wherein the at least one predetermined signal frequency comprises two predetermined frequencies or three predetermined frequencies.

17. The method of claim 11, wherein the unique time interval is a unique second of time.

18. The method of claim 11, wherein an emission rate of the one or more signal emission devices is twenty-four emissions per second.

19. The method of claim 11, wherein the unique sequence of synchronization signals includes at least eleven and up to and including thirteen synchronization signals.

20. The method of claim 11, wherein the calibration signal sequence further comprises at least one of a respective reference signal for each at least one predetermined signal frequency or a second alignment initiation signal.

* * * * *